United States Patent
Hollenton et al.

[11] 3,858,708
[45] Jan. 7, 1975

[54] METHOD AND APPARATUS FOR MANIPULATING ROD-LIKE ARTICLES

[75] Inventors: Frank Hollenton; John L. Ingalls, both of Richmond, Va.

[73] Assignee: AMF Incorporated, White Plains, N.J.

[22] Filed: Oct. 27, 1972

[21] Appl. No.: 301,377

[52] U.S. Cl. .......................... 198/20 C, 198/127 R
[51] Int. Cl. ............................................. B65g 47/00
[58] Field of Search ......... 198/127, 20, 22, 25, 160, 198/167, 33 AA, 33 AB, 34, 37, 39; 53/26, 148, 236; 131/25, 27, 94

[56] References Cited
UNITED STATES PATENTS

| | | | |
|---|---|---|---|
| 2,176,485 | 10/1939 | Bronander | 198/20 C |
| 2,553,719 | 5/1951 | Palmer | 198/37 |
| 3,165,953 | 1/1965 | Brown et al. | 198/20 C |
| 3,297,130 | 1/1967 | Greck | 198/33 AA |
| 3,608,972 | 9/1971 | Rudszinat | 198/20 C |

Primary Examiner—James B. Marbert
Assistant Examiner—Joseph E. Valenza
Attorney, Agent, or Firm—George W. Price; Charles J. Worth

[57] ABSTRACT

A method and apparatus for handling and transporting rod-like articles between production machines, for example articles such as cigarette filters between filter rod makers and cigarette filter tippers. Rods transported end to end along a longitudinal stream have the leading rods axially separated from the next adjacent rod by separator rollers which engage the rods of the stream, at least one of these rollers being a floating roller resiliently urged against the rod stream. The leading rods are successively deflected downwardly by engagement with and between the peripheries of a pair of rollers, the peripheral portions adjacent the stream of which rollers are inclined upwardly in the direction of travel and when the rollers rotate in the opposite direction such that both peripheries move downwardly adjacent the stream, they receive the leading separated rod, arrest its longitudinal movement and move it downwardly after which the rod is dropped onto a conveyor. The downwardly deflected rods move side by side on a conveyor to an infeed station where they are frictionally gripped and forced through a throat into the lower side of a storage hopper with a force sufficient for the rod-like articles to push upwardly further up into the storage hopper other rods already located therein.

26 Claims, 7 Drawing Figures

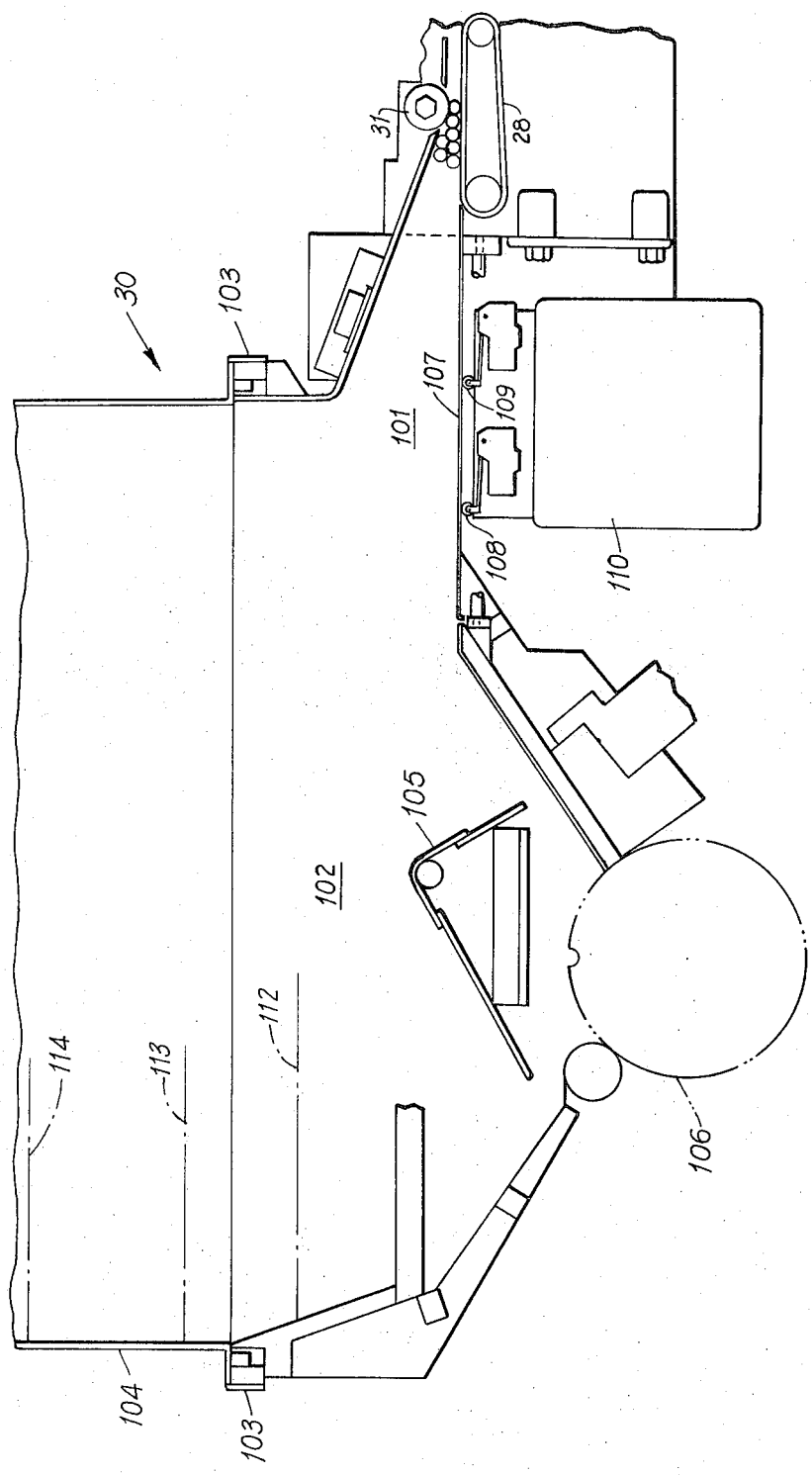

METHOD AND APPARATUS FOR MANIPULATING ROD-LIKE ARTICLES

BACKGROUND

This invention relates to manipulating rod-like articles such as slender cylindrical articles such as cigarettes and filter stubs, and particularly for handling such articles for transportation between various production operations.

In certain production operations, the articles are made or worked on at various stations which operate at different speeds and are remote from each other. For convenience, the invention will be discussed in particular with reference to the manipulation and handling of cigarettes or filter stubs for use in the manufacture of cigarettes, but it will be understood that the principles of the invention are equally applicable for the handling of other rod-like articles.

In the manufacture of cigarettes, the rod-like articles such as the filter stubs may be manufactured at one location, the filter rod maker and both transferred, re-arranged and changed to a different speed before arriving at a further production station such as a cigarette filter tipper. Moreover, the two production stations may be operated at different times and/or different capacities.

Thus, an arrangement must be provided for transfering the filter stubs between production stations, which arrangement should preferably or necessarily include not only means for changing the speed and arrangement of the articles, but also means for storing the articles between the stations.

Various arrangements have of course been known heretofore for transporting and re-arranging rod-like articles such as cigarettes or cigarette filter stubs between production stations. However, these arrangements have either been relatively large or complicated or they have been specifically intentioned to function in conjunction with a specific arrangement of production stations.

Thus, as arrangements of production stations are continuously changed, there exists a continuing need for new and improved rod-like article manipulating and transferring arrangements to function efficiently in conjunction with such new arrangements of production stations.

Further there exists a continuing need for new and improved arrangements for handling rod-like articles, which arrangements are more simplified, more compact and/or more efficient than arrangements known heretofore.

SUMMARY

Thus, it is a purpose of the present invention to provide a new and improved method and apparatus for handling and transferring rod-like articles.

The overall arangement of the present invention comprises means for feeding a plurality of rod-like articles end to end along an axially or longitudinally extending stream, a new and improved means for separating the leading rod-like article axially from the next adjacent rod-like article in the stream, a new and improved means for receiving the separated leading rod-like articles successively and for arresting their longitudinal movement and diverting them downwardly whereat they are deposited on a further conveyor or the like for movement essentially transverse to the longitudinal direction of the stream, and a new and improved means for receiving the articles arranged side by side along the conveyor and feeding them into a storage means.

One feature of the present invention comprises the arrangement wherein the various elements of the overall arrangement are driven from a common power source via a suitable arrangement of driving elements such as pulleys and endless belts.

Another feature of the present invention comprises a new, improved and novel arrangement for axially separating the leading article of the stream from the next rod-like article of the stream. The rod-like articles are delivered along this stream at a relatively high speed by a suitable means such as air conveyance. It has been known heretofore to separate the leading article of the stream axially to facilitate diversion of the leading article for travel in a different direction. In the past, these separating means have included rollers engaging the rods on opposite sides thereof and turning at a rate of speed greater than the speed of the remaining rods, thus accelerating this leading rod. As also known heretofore, for stabilizing the separating process, two sets of rollers can be provided, the upstream of which engages the rods and rotates at a peripheral speed equal to the speed of the remaining rods of the stream while the downstream set of rollers operates at a greater speed to effect said separation.

However, in the past, the axes of each set of rollers on opposite sides of the stream have been fixed in operation. Thus, initially setting the position of the axes of these rollers have proved to be a highly delicate operation, and even then the operation thereof has been less than totally reliable. For example, a given rod may be either manufactured with a slightly smaller diameter or distorted such that its cross-section is elongated in a direction parallel to the axes of the rollers. In either case, the result will be that such a rod will be properly engaged by the rollers, whereby the rod will slip, cancelling the separating effect and thereby causing jamming of the stream.

In accordance with the new and improved separator means of the present invention, at least one roller of at least the downstream set of rollers and preferably also the upstream set of rollers is a floating roller which means that its axis is movable towards and away from the stream of rod-like articles, and a spring means is provided urging this floating roller into engagement with the rod-like articles of the stream. In this manner, jamming for the reasons described above is eliminated. Further, this arrangement permits the application of a very light and uniform gripping pressure on the plugs which is not effected by the driving torque applied thereto. Further, through a careful selection of the spring load, a uniform normal force is applied which maintains positive grip regardless of the rod surface condition, and damage to the rods will be avoided.

Another new, improved and novel feature of the overall arrangement comprises a method and apparatus for receiving the leading rod-like article of the stream, arresting its longitudinal movement and diverting it downwardly, preferably for movement onto a conveyor on which the rod-like articles move in a direction transvers to the longitudinal direction of the stream, the articles being arranged side by side. According to this method and apparatus, a pair of deflecting rollers are provided one on each side of the stream, the rollers having a surface developable into a plane and the portion of the rollers closest to the stream constituting contact lines, the two contact lines being spaced on either side of a vertical plane through the stream a distance generally equal to the radius of the rods, the contact lines inclined upwardly in the direction of travel of the stream. With the rollers so arranged, they are rotated in opposite directions so that the peripheral surfaces of both rollers move downwardly as they pass through the contact lines. As the leading rod of the stream enters between the rollers, the contact lines thereof engage opposite sides of the rod at the leading end thereof. The points of contact on the contact lines then move downwardly and rearwardly, engaging progressively rearward points on the rod as the latter moves downwardly. If the apparatus is arranged for optimal operation, the lowermost rearwardmost points of the contact lines will engage the axial midpoint of the rod, and thus also its center of gravity, at the instant just before the rollers completely release the said leading rod for free-falling downward movement onto the conveyor. Of course the downward movement of the leading rod should be rapid enough so that the next rod in the stream can pass over the first said rod without bumping into the rear end thereof. Preferably, the deflector rollers will be cylinders arranged with their axes parallel to each other and inclined upwardly in the direction of travel of the rods along the stream. While the space between the contact lines is described as generally equal to the diameter of the rods, it will of course be slightly less than this diameter by an amount sufficient to insure proper frictional engagement between the rollers and the rods. The actual amount of this clearance required to assure proper frictional gripping will of course depend on the material of the rods and the material of the surfaces of the rollers. It is an advantage of the invention that rods of different lengths can be handled by these rollers by simply changing the vertical level of the stream relative to the deflector rollers, whereby with such proper vertical adjustment, rods of any length can be manipulated such that their axial midpoints, and hence also their centers of gravity will be gripped at the last instant before the rods are dropped onto the conveyor.

Another new, improved and novel feature of the overall arrangement comprises a new means for stacking the rods from the conveyor on which they move with their axes side by side into a storage means such as a hopper or the like. In accordance with this feature of the invention, the rods are delivered side by side through a throat which frictionally forces the rods through an opening preferably located toward the bottom of the hopper whereby the introduction force is sufficiently great such that the introduced rod is capable of moving other rods ahead of it in the hopper inwardly and upwardly. The throat may be separated from the point of entrance of the rods into the main part of the conveyor, this separation defining an infeed compartment, the bottom of which may be constituted by a control plate, the weight of articles on which can be sensed to ascertain when the level of articles in the main hopper has reached certain given levels, for example a full level or an empty level.

Thus, it is an object of this invention to provide a new and improved arrangement for manipulating and transferring rod-like articles.

It is another object of this invention to provide a means for controlling the transmission and maintaining uninterrupted production rates between independently operating machines which may be separately and remotely located from each other, and wherein the articles between these machines are conveyed, at least in part, by high speed conveyance means such as pneumatic means.

It is another object of this invention to provide a new and improved means for separating the leading rod from the remaining rods, and in particular from the next adjacent rod in a longitudinally extending stream of such rods, which separating means is operable to apply a light and uniform gripping pressure on the leading rod, unaffected by the driving force driving the separating means.

It is another object of this invention to provide a new and improved means for separating the leading rod of a stream from the remainder thereof, which means comprises a set of rollers, at least one of which is resiliently urged towards the rods of the stream.

It is still another object of this invention to provide a method and apparatus for arresting longitudinal movement of rod-like articles and diverting the same downwardly onto a conveyor.

It is still another object of the invention to provide a new and improved leading rod arresting and diverting means which comprises a pair of rollers arranged side by side and adapted to engage and grip a leading roller moving longitudinal therebetween and delivering the same downwardly.

It is another object of this invention to provide a means for separating articles at the point of arrestment to allow uniform transposition from high longitudinal velocity to pure lateral movement for controlled stacking.

It is still another object of this invention to provide a means for positively arresting articles being transferred at high axial velocity and simultaneously imparting lateral movement and acceptable realignment to the articles preparatory for transmittal into the infeed compartment of the next in line production station.

It is still another object of this invention to provide a new and improved arrangement for feeding rod-like articles side by side into a storage container such as a hopper.

It is another object of this invention to provide a new and improved means for feeding rod-like articles into a storage container, according to which the rod-like articles are frictionally engaged and moved through a throat with a sufficient force to enter the storage container and force upwardly rod-like articles already located therein.

It is still another object of this invention to provide a means for introducing rod-like articles into a storage container such as a hopper or the like wherein it is possible to control the hopper level without feeler arms.

Other objects and the advantages of the invention will become apparent from the detailed description to follow, together with the accompanying drawings.

BRIEF DESCRIPTION OF THE DRAWINGS

There follows a detailed description of preferred embodiments of the invention to be read together with the accompanying drawings wherein:

FIG. 2A is a plan view of the portion of the invention shown at the righthand side of FIGS. 2 and 3.

FIG. 6 is a schematic elevational view of the rod storage means and the means for delivering articles thereinto.

DESCRIPTION OF THE PREFERRED EMBODIMENTS

Figure 1:
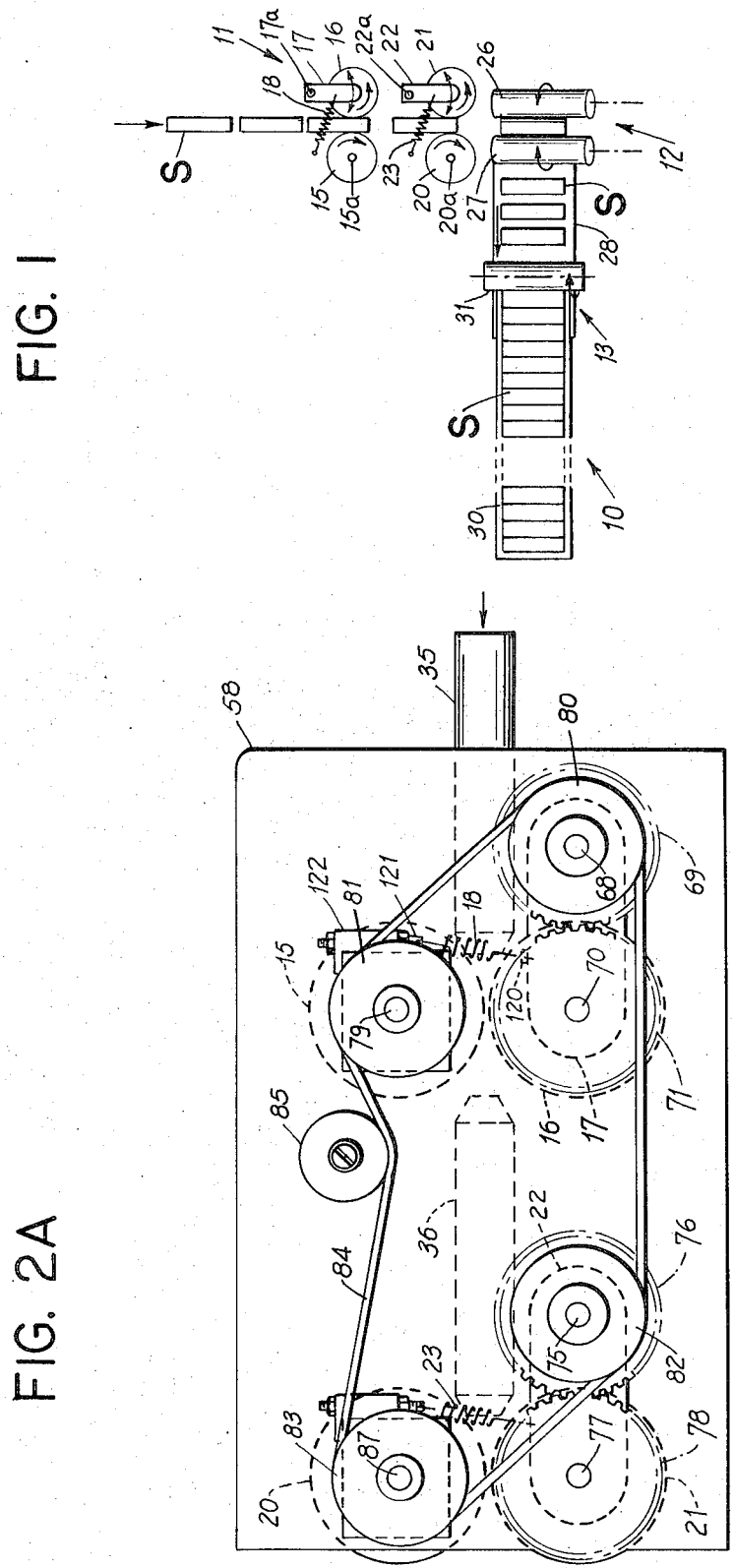
FIG. 1 is a highly schematic plan view of the overall arrangement showing how the rod-like articles move through the various portions of the arrangement.

Referring now to the drawings, like elements are represented by like numerals throughout the several views.

FIG. 1 illustrates schematically the overall rod-like article handling and transferring apparatus 10. It comprises a separator section 11 which receives a longitudinally extending stream of end to end rod-like articles S and separates the leading rod axially from the remainder of the rods in the stream. Successive leading rods then pass between deflector rollers 26 and 27 of a deflector means 12, whereby the rods move downwardly (into the plane of the drawing) onto a conveyor 28 which carries them to a stacking section 13.

The separator section 11 comprises a pair of opposed rollers 15 and 16 which rotate in opposite directions as indicated by the arrows thereon to advance the rods of the stream at a predetermined speed. Roller 15 is rotatable about fixed axis 15a. Roller 16 is a floating roller, the axis of which is mounted in link arm 17 which is in turn mounted for pivotal movement about point 17a. A spring 18 urges link arm 17 clockwise about its pivot axis thus urging roller 16 into engagement with the rods S passing thereby. To effect separation, there is provided a further set of rollers 20 and 21. These are constructed essentially the same as rollers 15 and 16 in that roller 20 rotates about fixed axis 20a and the axis of roller 21 is mounted in a link arm 22 which is pivotable about axis 22a, and which link arm is urged clockwise into engagement with the rod S passing thereby by means of a spring 23. The essential difference between the rollers 20 and 21 are opposed to rollers 15 and 16 is that the former rotate at a peripheral speed faster than that of rollers 15 and 16, thereby separating the leading rod from the rod immediately behind it.

After the rods have passed downwardly between rollers 26 and 27 onto conveyor 28, they move to the left as indicated by the arrow on conveyor 28, after which they are frictionally gripped in a throat which is a space less than the diameter of the rod, this throat located beneath the gripper roller 31, the top of which is visible in FIG. 1, and the upper surface of conveyor 28. This frictional force urges the rods into the hopper 30.

Figure 2:
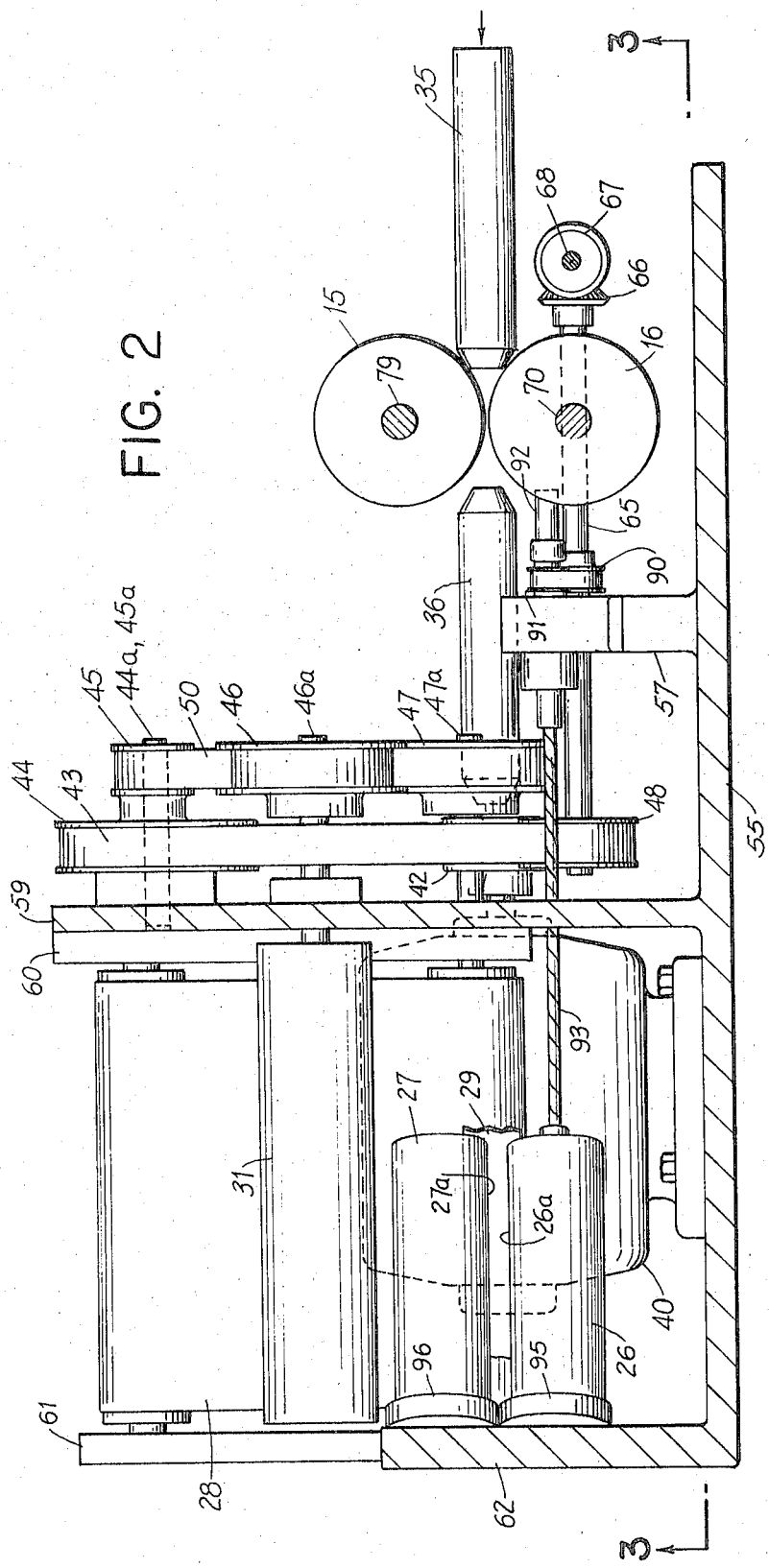
FIG. 2 is a horizontal sectional view taken along line 2—2 of FIG. 3.
Figure 3:
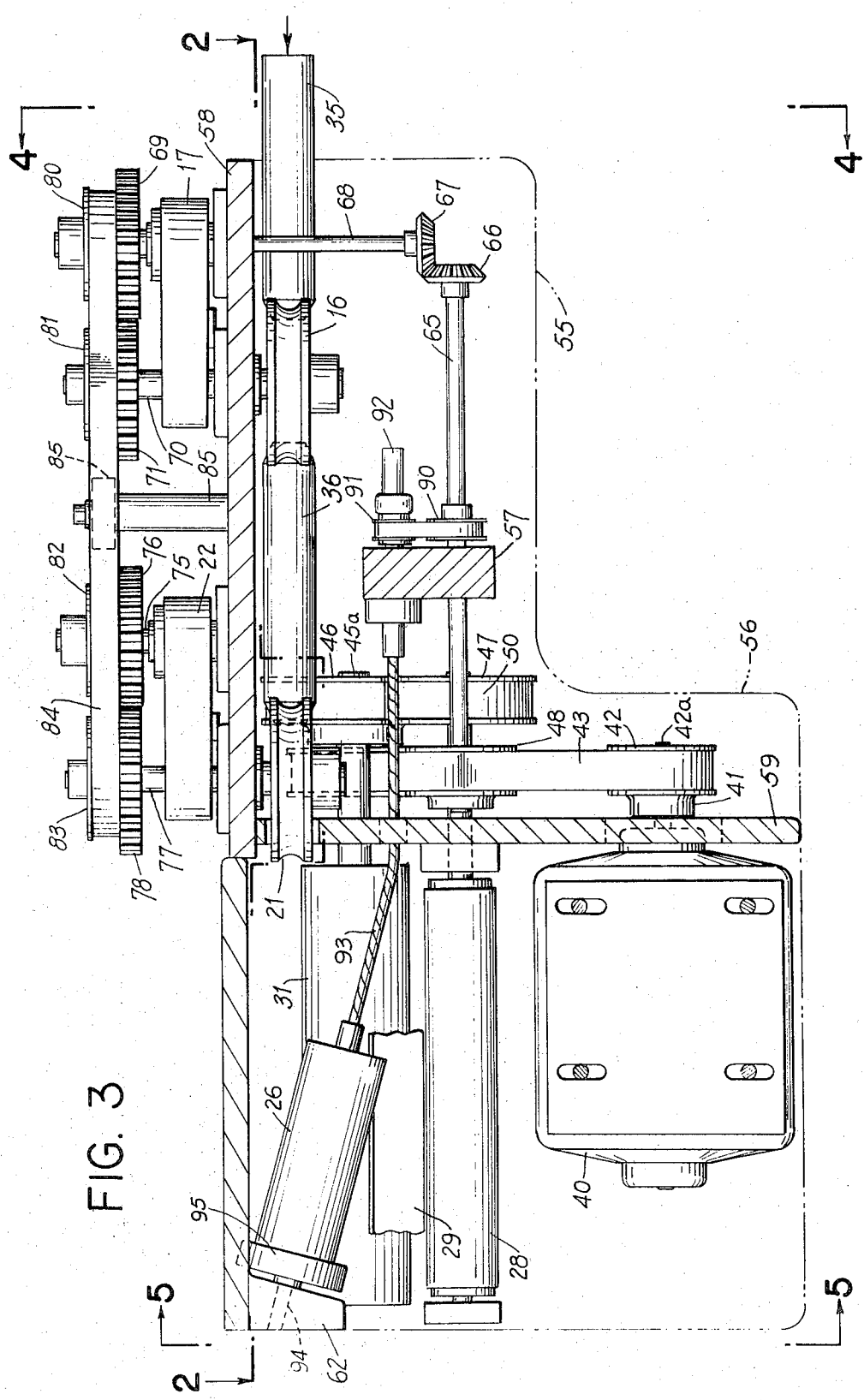
FIG. 3 is a side elevational view taken along line 3—3 of FIG. 2.
Figure 5:
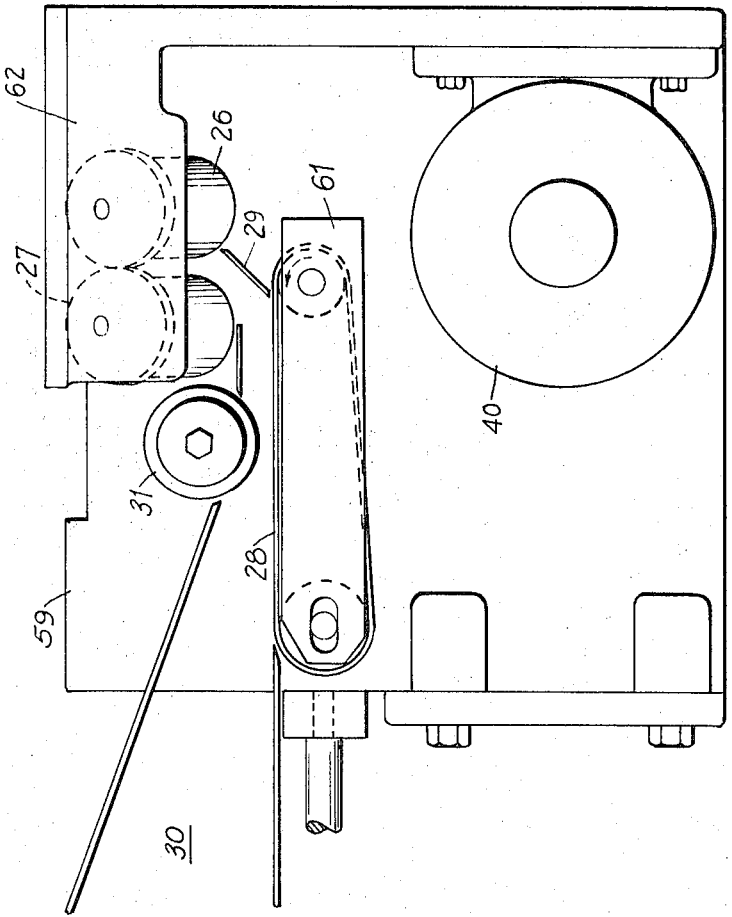
FIG. 5 is an end elevational view taken along line 5—5 of FIG. 3.

Referring now in particular to FIGS. 2 and 3, the rods enter from the right-hand end of these figures as shown by the arrows into a stationary guide tube 35 and then between the rollers 15 and 16 and then into a further stationary guide tube 36 and then between separator rollers 20 and 21. As the rods move rapidly to the left from between rollers 20 and 21, they pass between deflector rollers 26 and 27 which rotate in opposite directions as shown by the arrows in FIG. 1. Between these rollers, the forward end of the rod is engaged on opposite sides by contact lines 26a and 27a of the rollers 26 and 27, each of these lines of course representing the closest points on the surface of each roller to the center of the stream. Actually, to assure proper frictional engagement, it will be understood that the gap between the contact lines 26a and 27a will actually be somewhat less than the diameter of the rods, and these "lines" might actually be strips of a finite width in the circumferential direction. As indicated above, the forward end of the rod first engages the contact lines. Then, as the rollers 26 and 27 rotate, progressively rearward and downward points along the contact lines engage progressively rearward points along the rod until, under optimal conditions, at the last instant for dropping the rod, the rearwardmost lowermost points on the contact lines will engage the longitudinal midpoint which of course will generally be the center of gravity of the rod. This of course will assure that the rod is oriented horizontally as it drops onto the conveyor. Referring to FIG. 5, after the rods have passed between the rollers 26 and 27, they land on deflector plate 29 and hence onto an elongated conveyor 28, on which they pass beneath gripper roller 31 which, together with the surface of conveyor 28, exerts a strong force urging the rods to the left (FIG. 5) into the hopper 30. The purpose for this strong introduction force will be explained later.

The elements of the invention are mounted on a suitable frame structure including a side frame 55 which has a lower part 56. Projecting outwardly from side frame 55 is a mounting block 57. Extending across from the top of side frame 55 is a horizontal support plate 58. Extending outwardly from lower side frame 56 is a vertical transverse partition 59. Side supports 60 and 61 are provided for mounting the rollers of conveyor 28. Support 60 is attached to partition 59. Partition 61 is visible in FIG. 5. An additional side plate 62 extends outwardly from the end of side frame 56 for rotatably supporting rollers 26 and 27.

For driving the various moving parts of the apparatus, there is provided a power source in the form of a motor 40, which motor is visible in each of FIGS. 2, 3, 4 and 5. Output shaft of motor 41 has mounted thereon a pulley 42 rotatable about axis 42a, this pulley driving an endless belt 43 which in turn drives pulleys 48 and 44 about axes 48a and 44a respectively (see FIG. 4). Coaxial and integral with pulley 44 is a further pulley 45 which drives a further endless belt 50. This endless belt 50 in turn passes about and drives a pulley 47 about axis 47a and it passes around a portion of the periphery of a pulley 46 to turn the same about axis 46a.

The driving force for the rollers 15, 16, 20 and 21 is initially derived from roller 48 which turns shaft 65 which acts through bevel gears 66 and 67 to turn a shaft 68. The connection of shaft 68 to the rollers and the details of the various rollers and their driving means will be described later.

It is noted that this shaft 65 is supported in the mounting block 57. Also mounted in this block is a shaft 92 which is driven from shaft 65 via an endless belt engaging pulleys 90 and 91. Shaft 92 then operates a flexible shaft 93 to turn the roller 26 which is journalled in plate 62 at 94. The outer upper ends of rollers 26 and 27 include raised annular portions 95 and 96, by means of which the force exerted through flexible shaft 93 to roller 26 is utilized to turn the roller 27.

The conveyor 28 is driven by a shaft 98 (see FIG. 2) which is integral with the pulley 47 and rotatable about axis 47a. Finally, the gripper roller 31 is driven by shaft 99 (see FIG. 2) which is integral with pulley 46 and rotatable about axis 46a.

Figure 4:
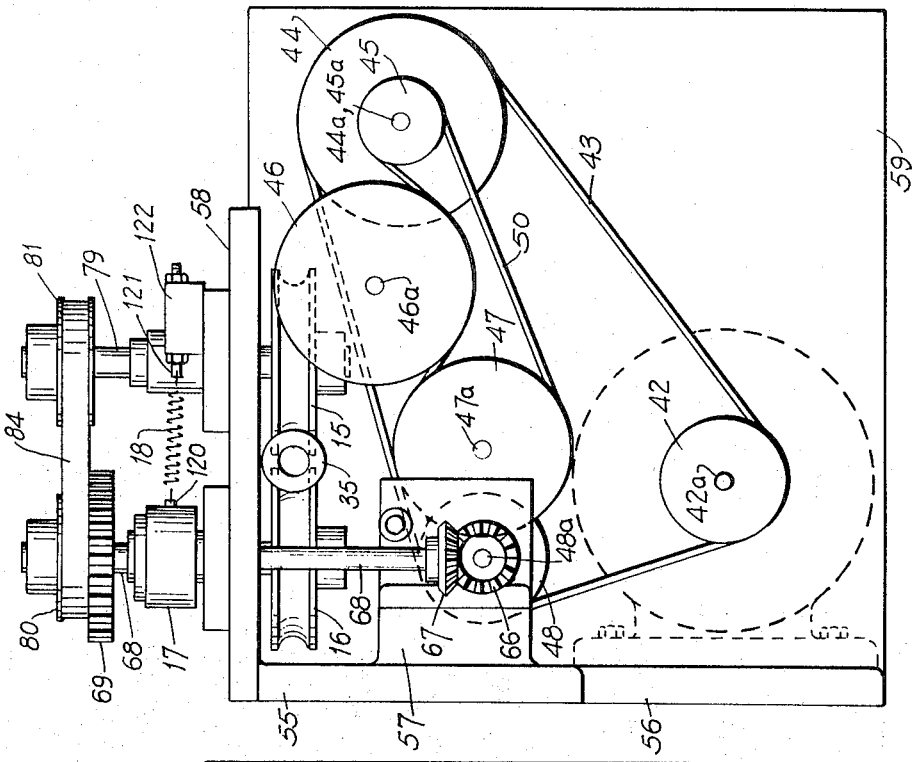
FIG. 4 is an end elevational view taken along lines 4—4 of FIGS. 2 and 3.

The means for transmitting the rotary motion of shaft 68 to the rollers 15, 16, 20 and 21 is best shown in FIGS. 2A, 3 and 4. Above the plate 58 the link arm 17 is freely mounted on shaft 68 for free rotation relative thereto. A gear 69 is fixed on this shaft 68. A further shaft 70 is journalled in the link arm 17 at the other end thereof. This shaft 70 has fixed thereon for rotation therewith a gear 72, which meshes with gear 69, and the roller 16 itself. On the other side of the rod stream from shaft 70 is a further shaft 79 on which the roller 15 is fixedly mounted for rotation therewith. Visible in FIGS. 2A and 4 is the spring 18 which is anchored at one end 120 to the link arm 17 and at its other end 121 to a mounting 122 which is fixed on horizontal support plate 58. Thus, spring 18 urges link arm 17 clockwise about the axis of shaft 68, thus urging shaft 70 and hence roller 16 resiliently towards the center line of the longitudinal stream of rods. Although it does not show up in the drawings, it will be evident that where shaft 70 passes through the support plate 58, there is provided an enlarged opening, at least in the form of an elongated arcuate slot permitting the shaft 70 to undergo this arcuate movement about the axis of shaft 68.

The drive elements for the separator rollers 20 and 21 are essentially the same as those as described for rollers 15 and 16. There is provided a link arm 22 freely rotatably mounted on a shaft 75 and having a further shaft 77 journalled in its other end. A gear 76 is fixed on the shaft 75, and a further gear 78 is fixed on shaft 77 and meshes with gear 76. Also fixed on shaft 77 is the roller 21. The spring 23 which is drawn schematically in FIG. 1 and visible in part in FIG. 2A urges the link arm 22 clockwise about the axis of shaft 75, thus resiliently urging the roller 21 into engagement with the stream of rod-like articles. Mounted on the opposite side of the article stream from the shaft 77 is a further shaft 87 which is fixed in place, and on which is fixedly mounted for rotation therewith the roller 20.

As indicated above, the drive line from the motor 40 is transmitted to the shaft 68. For rotating the remaining shafts 70, 75, 77, 79 and 87, there are provided a plurality of pulleys 80, 81, 82 and 83 which are fixed for rotation with shafts 68, 79, 75 and 87, respectively. These pulleys are interconnected by an endless drive belt 84. The shafts 70 and 77 of course are not connected to this drive belt since these shafts must be left free to swing arcuately about the axes of their respective link arms. However, the drive to shaft 70 is of course through meshing gears 69 and 71, and the drive to shaft 77 is of course through meshing gears 76 and 78. Tension in the belt 84 is provided by a tensioning roller 85 which engages the belt and may be adjusted towards and away therefrom to set the tension.

Referring now to FIG. 6, there is shown the means for stacking the rods after they have passed onto conveyor 28. The hopper 30 includes an infeed compartment 101 opened into the side/bottom of the main compartment 102 of the hopper 30. This hopper includes mounting flanges 103 on which may be mounted a conventional reservoir tray 104. Also illustrated in FIG. 6 are lines 112, 113 and 114 which represent a very low level of filters in the hopper, a normal level and a full level, respectively. Towards the bottom of main compartment 102 there is provided a plate 105 for distributing the rods towards the sides of the hopper bottom so that they will flow smoothly into the flutes of a fluted outlet drum 106.

The bottom of infeed compartment 101 is defined by a control plate 107 which may be a cantilever type scale plate, and beneath which are located limit switches 108 and 109 which sense the vertical position of plate 107, switch 108 being a "full hopper" switch which is activated when the weight on plate 107 and hence the vertical position of plate 107 reflects a level of rods up to the line 114. Similarly, the switch 109 can sense a higher position of plate 107 whereat the weight of rods thereon is such that hopper 30 is filled only to the level 112. A control unit 110 is shown schematically and this of course can be provided with any type of indication means such as dials, lights or even automatic apparatus cut-off means.

As can be seen in FIG. 6, as the conveyor 28 carries the rods between itself and roller 31, there is exerted on the rods a strong frictional force urging the same into the hopper. This force is sufficient for pushing the other rods already in the hopper inwardly and upwardly, whereby with this infeed means, the hopper can be loaded up to a high level such as level 114. This is particularly so when the rods are relatively light and durable elements such as cigarette filter stubs.

Thus, it will be seen that an advantage of this arrangement is that the hopper level can be controlled without the conventional feeler arms, photo-switches and the like. This is especially important when utilizing portable trays such as 104. Of course the installation of expensive detecting devices on such conventional trays would be impractical. An advantage of the present invention is that because of its simplicity and compactness, it may be installed on existing automatic cigarette tipper machines without interfering with presently employed semi-automatic or manual tray feed facilities.

The operation of the invention will be apparent from the preceding discussion. However, for convenience, the operation will be summarized briefly below.

Rods such as cigarette filter stubs are fed along a high speed longitudinal stream which passes through stationary guide tube 35, between rollers 15 and 16, through stationary guide tube 36 and then between separator rollers 20 and 21. By appropriately dimensioning the pulleys 82 and 83 and the gears 76 and 78, the rollers 20 and 21 can be made to rotate faster than the rollers 15 and 16, whereby the rollers 20 and 21 separate the leading rod passing therebetween from the rod immediately behind it.

The leading rod then passes between rollers 26 and 27, which rollers turn in opposite directions urging the rods downwardly. Under optimal conditions, the rods will move downwardly such that just before they are released they are engaged at their longitudinal midpoints by the lowermost ends of the contact lines 26a and 27a, whereby they will fall evenly onto the conveyor 28. To accomplish this optimal operation for different lengths of rods, it is simply necessary to change the height of the longitudinal stream relative to the rollers 26 and 27. Any auitable means can be provided to accomplish this. For example, in a preferred arrangement, each of the rollers 15, 16, 20 and 21 can be adjusted vertically on its respective shaft, and of course the guide tubes 35 and 36, the mounting means for which is not shown, could also adjusted vertically. After falling onto conveyor 28, the rods move sideways therealong and pass between the conveyor 28 and the roller 31, which elements create a frictional force urging these rods inwardly and upwardly within the hopper 30.

Although the invention has been described in considerable detail with respect to the preferred embodiments, it will be apparent that the invention is capable of numerous modifications and variations apparent to those skilled in the art without departing from the spirit and scope of the invention.

We claim:

1. In an apparatus for handling rods, an arrangement for receiving a longitudinally moving stream of rods end to end, arresting the articles of the stream and diverting them downwardly onto a path which extends at an angle to said stream, on which path the articles move with their axes side by side, comprising:

means for advancing the stream of rods along a first horizontal straight line path longitudinally, end to end, a pair of deflector rollers located one on each side of said straight line path, each roller having a peripheral surface developable into a plane and movable about its axis and adjacent to said stream such that the part of the peripheral surface closest to a vertical plane passing through the center of the stream lies on a contact line which is inclined upwardly relative to the said first straight line in the direction of travel of the rods in the stream, the two contact lines of the two rollers being parallel to each other and being located on opposite sides of the said vertical plane through the stream and spaced therefrom a distance generally equal to the radius of the rods, the contact lines thus defining a gap generally equal to the diameter of the rods, which gap intersects the said straight line path and is inclined upwardly relative thereto such that the forward ends of the rods advancing along said straight line path become engaged by the contact lines of the rollers, means for rotating the two deflector rollers in opposite directions about their respective axes for moving both peripheries downwardly as the peripheries move through their respective contact lines adjacent the stream of rods, said means being operable to turn the peripheries of the rollers at a speed relative to the longitudinal speed of the rods as imparted by the rod advancing means such that rods, upon initially engaging the contact lines of the rollers, are moved both in the longitudinal direction and downwardly, wherein the longitudinal movement of the rods is gradually reduced over a given longitudinal distance from their initial speed upon first engaging the rollers so that the rods fall downwardly after leaving the rollers, said means for advancing comprising means for advancing rods of a predetermined length, said rollers being positioned at a height, relative to the height of the stream of rods, to grip a forward part of each rod with points on the contact lines above the lowermost ends of the contact lines, and as the rods move downwardly, progressively gripping rearward points on the rods by progressively rearward points on the contact lines until the rod is released by the rollers for downward movement onto said path, and including a space in the path of the rod beyond the point of initial engagement of the rod and the contact lines permitting substantial longitudinal movement of the rod from the time of contact until it is received on the receiving means, and receiving means for receiving the arrested rods falling under gravity from the rollers, the receiving means positioned to receive the leading ends of the rods at points spaced longitudinally, taken in the direction of travel of the rods, from the point where the rods first engage the contact lines, so as to receive the rods after their longitudinal movement has been gradually arrested over said given longitudinal distance.

2. An apparatus according to claim 1, wherein said rollers are cylindrical and their axes are parallel to each other and lie in a plane tilted upwardly in the direction of travel of the stream.

3. An apparatus according to claim 1, said deflector rollers being drivingly engaged with each other, such that when either roller is power driven, it drives the other roller synchronously therewith.

4. An apparatus according to claim 1, said advancing means comprising a separator means for advancing the leading rod of a stream faster than the remaining rods of the stream to separate that leading rod axially from the immediately following rod in the stream.

5. An apparatus according to claim 4, said separator means comprising at least one set of rollers, the peripheries of which rollers engage opposite sides of the rods to advance them, one of said rollers being rotatable about a fixed axis, and the other roller being a floating roller, the axis of which is movable toward and away from the stream, and a spring means urging the floating roller toward the stream.

6. An apparatus according to claim 5, including a link arm freely pivotably mounted on a shaft having a fixed axis, a further shaft parallel to the first said shaft and mounted in said link arm for pivotal movement therewith, said floating roller mounted on said further shaft, and said resilient means comprising a spring urging the link arm about the said fixed axis to urge the floating rollers into engagement with the rods in the stream.

7. An apparatus according to claim 6, including a drive means drivingly engaged with said fixed axis shaft to turn the same, a gear on the fixed axis shaft for rotation therewith, a gear on the further shaft for rotation therewith and drivingly meshing with the first said gear for driving the floating roller about its axis.

8. An apparatus according to claim 7, including a second set of rollers upstream from the first said set of rollers, the second set engaging the periphery of the rods upstream from the first set, the peripheral speed of the second set being substantially equal to the speed of the remaining rods in the stream upstream from said first set, at least one roller of the second set being a floating roller; said second set of rollers including a link arm freely pivotably mounted on a shaft having a fixed axis, a further shaft parallel to the first said shaft and mounted in said link arm for pivotable movement therewith, said floating roller of the second set mounted on said further shaft, and said resilient means comprising a spring urging the link arm about said fixed axis to urge the floating roller into engagement with the rods of the stream; each of said fixed axis shafts and the shafts on which the fixed axis rollers are mounted including a pulley, and an endless drive means drivingly engaging all of said pulleys for driving the remaining rollers of said sets via said drive means.

9. An apparatus according to claim 4, including means for adjusting the vertical height of the stream of rods including the rollers of the separator means for varying the vertical height of the stream relative to the deflector rollers.

10. An apparatus according to claim 1, said deflector rollers being positioned to release each rod as the contact lines grip the rod midway of the said predetermined length thereof.

11. An apparatus according to claim 1, said receiving means being a conveyor and including a stacking means for feeding the rods from the conveyor into a storage container through the side of the storage container below the upper level of the rods in the container when the container is full.

12. An apparatus according to claim 11, said stacking means comprising an infeed means, said infeed means including a gripper roller located above and defining with said conveyor an entrance throat, the conveyor being movable and the gripper roller being rotatable to urge the rods through the throat with a force sufficiently great to push upwardly in the storage container those rods preceding it thereinto.

13. An apparatus according to claim 12, including a common power means for operating the rod advancing means means, the deflector means, the conveyor and the gripper roller, means drivingly engaging the power means with the said rod advancing means to drive the same, means drivingly engaging the power means with said deflector rollers of the deflector means to operate the same, means drivingly engaging the power means with the conveyor to operate the same, and means drivingly engaging the power means with the gripper roller to operate the same.

14. An apparatus according to claim 13, said power means including a motor drivingly engaged with an endless drive, said endless drive operably drivingly engaging shafts which are in turn operatively connected to the rollers of the rod advancing means, the rollers of the deflector means, and a further endless drive, said further endless drive operatively drivingly engaged with shafts connected to the conveyor and the gripper roller.

15. An apparatus according to claim 13, the deflector rollers being cylindrical and drivingly engaged together such that one deflector roller is positively driven and it drives the other deflector roller.

16. An apparatus according to claim 13, said rod advancing means comprising two sets of rollers, said driving means positively connected to drive only one roller at one set, and including an endless means transmitting the driving force from said one roller to the other rollers of the rod advancing means.

17. An apparatus according to claim 12, said container including a main compartment and an infeed compartment, said infeed means located at one end of the infeed compartment, the other end of the infeed compartment open into an end of the main compartment, such that the rods moving side by side parallel to each other through the throat and through the infeed compartment move into the main compartment.

18. An apparatus according to claim 17, at least a portion of the bottom of the infeed compartment defined by a control plate, scale means for sensing the level of rods in the main compartment by sensing the downward gravitational force exerted by the rods in the main compartment and the infeed compartment on the control plate.

19. An apparatus according to claim 18, said control plate being a cantilever plate supported below at least in part by a pair of switches, one switch operable to sense downward movement of the plate to a certain level to sense a full level in the main compartment; and the other switch operative to sense movement of the plate to a raised level to sense a reduction of rods to a low level in the main compartment.

20. An apparatus according to claim 17, said main compartment being a hopper, said means for closing the ends and bottom of the container comprising vertical end walls and inwardly tapered bottom walls on the hopper, the infeed compartment opening into one of said inwardly tapered bottom walls.

21. An apparatus according to claim 20, including a discharge outlet at the lowermost part of the hopper.

22. An apparatus according to claim 17, said opposing frictional surfaces of the throat including the conveyor on which the rods are carried to the infeed means and a rotatable gripper roller spaced slightly above the conveyor to form therewith said throat.

23. A method of gradually arresting longitudinal movement of a horizontal stream of end to end rods over a given longitudinal distance and directing them downwardly generally perpendicular to the direction of travel of the stream, comprising the steps of: passing the horizontally longitudinally moving rods between a pair of rollers, each having a peripheral surface developable into a plane, the closest part of the periphery of each roller to a vertical plane through the center line of the stream being a contact line, the two contact lines being spaced one on each side of the said vertical plane a distance generally equal to the radius of the rods and being parallel to each other and inclined upwardly in the direction of travel of the rods, and contact lines thus defining a gap generally equal to the diameter of the rods, which gap intersects the said stream and is inclined upwardly relative thereto such that the forward ends of the rods advancing along the stream engage the contact lines of the roller, rotating the rollers in opposite directions to move the peripheries of both rollers downwardly across their respective contact lines at a speed, relative to the longitudinal speed of the rods, such that the rods, after initially engaging the contact lines, move downwardly and also continue to move in the longitudinal direction over a given longitudinal distance through a space provided in the path of the rods beyond the point of initial engagement of the rods with the contact lines to permit substantial longitudinal movement of the rods from the time of contact until they are received on the receiving means as the longitudinal speed of the rods are gradually reduced, and at the end of which given distance the rods are released by the rollers to fall under gravity to a receiving means, and the said step of passing the rods includes engaging the forward end of each rod by opposing points on the two contact lines and moving the rods longitudinally over said given distance and downwardly, reducing the longitudinal speed of the rods as the rods are released, as the points of contact of the contact lines on the rods move downwardly along the contact lines and rearwardly along the rods.

24. The method of claim 23, including initially gripping the rod at a certain point along its length forward of its longitudinal midpoint by points spaced upwardly and forwardly of the lowermost ends of the contact lines, such that at the end of said progression, the lowermost ends of the contact lines engage the longitudinal midpoint of the rod at the moment when the rod is released from the rollers.

25. The method of claim 23, wherein the step of gripping includes gripping with cylindrical rollers.

26. The method of claim 23, including lowering the rods at a speed fast enough such that each rod is below the path of the remaining rods in the stream before the next rod in the stream closes the longitudinal gap which was previously created between itself and the preceding leading rod.

* * * * *